US012255004B2

(12) United States Patent
Zhu et al.

(10) Patent No.: US 12,255,004 B2

(45) Date of Patent: Mar. 18, 2025

(54) MULTI-PHASE INTEGRATED COUPLED INDUCTOR STRUCTURE

(71) Applicant: VIRGINIA TECH INTELLECTUAL PROPERTIES, INC., Blacksburg, VA (US)

(72) Inventors: Feiyang Zhu, Blacksburg, VA (US); Qiang Li, Blacksburg, VA (US); Fred C. Lee, Blacksburg, VA (US)

(73) Assignee: VIRGINIA TECH INTELLECTUAL PROPERTIES, INC., Blacksburg, VA (US)

( * ) Notice: Subject to any disclaimer, the term of this patent is extended or adjusted under 35 U.S.C. 154(b) by 705 days.

(21) Appl. No.: 17/199,953

(22) Filed: Mar. 12, 2021

(65) Prior Publication Data

US 2022/0293326 A1 Sep. 15, 2022

(51) Int. Cl.

| | |
|---|---|
| ***H01F 27/28*** | (2006.01) |
| ***H01F 27/24*** | (2006.01) |
| ***H01F 27/40*** | (2006.01) |
| ***H01F 27/42*** | (2006.01) |

(52) U.S. Cl.

CPC ......... *H01F 27/24* (2013.01); *H01F 27/2804* (2013.01); *H01F 27/40* (2013.01); *H01F 27/42* (2013.01)

(58) Field of Classification Search

CPC ...... H01F 27/24; H01F 27/2804; H01F 27/40; H01F 27/42; H01F 3/10; H01F 37/00; H01F 2017/004; H01F 2017/0073; H01F 27/28

See application file for complete search history.

(56) References Cited

U.S. PATENT DOCUMENTS

| | | | | |
|---|---|---|---|---|
| 5,568,111 | A * | 10/1996 | Metsler | H01F 17/04 336/83 |
| 9,564,264 | B2 | 2/2017 | Su et al. | |
| 2013/0207745 | A1* | 8/2013 | Yun | H03H 7/09 333/175 |
| 2015/0235753 | A1* | 8/2015 | Chatani | H01F 27/2804 336/200 |
| 2016/0086723 | A1* | 3/2016 | Su | H05K 1/0373 336/200 |
| 2016/0113115 | A1* | 4/2016 | Kwon | H01L 25/065 361/767 |
| 2016/0307690 | A1* | 10/2016 | Madsen | H01F 27/29 |
| 2018/0204666 | A1* | 7/2018 | Zhou | H01F 27/29 |

(Continued)

OTHER PUBLICATIONS

Zhu et al. "20MHz, Two Phase Negative Coupled Inductor Design for Integrated Voltage Regulator in Smartphone Applications", Center for Power Electronics Sytems, the Bradley Department of Electrical Engineering, Virginia Polytechnic Institute and State University, Blacksburg, VA 24060, USA.

(Continued)

*Primary Examiner* — Mang Tin Bik Lian

(74) *Attorney, Agent, or Firm* — Thomas | Horstemeyer, LLP

(57) ABSTRACT

Aspects of multi-phase integrated coupled inductors are described. In one embodiment, a multi-phase integrated coupled inductor includes a magnetic core and a coupled set of inductors. Each inductor can include conductive vias that are asymmetrically distributed in two symmetrical core slots in the magnetic core, so that each inductor has a different number of lateral-flux vias in each slot.

20 Claims, 8 Drawing Sheets

303

(56) References Cited

U.S. PATENT DOCUMENTS

| | | | | |
|---|---|---|---|---|
| 2019/0172629 | A1* | 6/2019 | Zhou | H01F 27/29 |
| 2019/0189334 | A1* | 6/2019 | Miyashita | H05K 1/181 |
| 2020/0219647 | A1* | 7/2020 | Ji | H01F 27/303 |
| 2021/0210271 | A1* | 7/2021 | Ji | H01F 27/28 |
| 2022/0294409 | A1* | 9/2022 | Sato | H03H 7/09 |

OTHER PUBLICATIONS

Sturcken et al. "A 2.5d Integrated Voltage Regulator Using Coupled-Magnetic-Core Inductors on Silicon Interposer," IEEE Journal of Solid-State Circuits, vol. 48, pp. 244-254, Jan. 2013.

Krishnamurthy et al. A Digitally Controlled Fully Integrated Voltage Regulator With On-Die Solenoid Inductor With Planar Magnetic Core in 14-nm Tri-Gate CMOS:, IEEE Journal of Solid-State Circuits, vol. 53, No. 1, Jan. 2018.

Fukuoka et al. "An 86% Efficiency, 20mhz, 3d-Integrated Buck Converter with Magnetic Core Inductor Embedded in Interposer Fabricated by Epoxy/Magnetic-Filler Composite Build-Up Sheet," 2019 IEEE Applied Power Electronics Conference and Exposition (APEC), pp. 1561-1566, Mar. 2019.

Su et al. "Design and Evaluation of a High-Frequency LTCC Inductor Substrate for a Three-Dimensional Integrated DC/DC Converter," IEEE Transactions on Power Electronics, vol. 28, No. 9, pp. 4354-4364, Sep. 2013.

Bellaredj et al. "Design, Fabrication, and Characterization of Package Embedded Solenoidal Magnetic Core Inductors for High-Efficiency System-In-Package Integrated Voltage Regulators," IEEE Transactions on Magnetics, vol. 55, pp. 1-7, Jul. 2019.

Yazaki et al. "Embedded Planar Power Inductor in an Organic Interposer for Package-Level DC Power Grid," IEEE Transactions on Magnetics, vol. 50, pp. 1-4, Nov. 2014.

Su et al. "FEA modeling of the low profile coupled inductor with non-uniform flux distribution," 2013 Twenty-Eighth Annual IEEE Applied Power Electronics Conference and Exposition (APEC), pp. 2416-2423, Mar. 2013.

Mu et al. "Finite Element Analysis of Inductor Core Loss Under DC Bias Conditions," IEEE Transactions on Power Electronics, vol. 28, pp. 4414-4421, Sep. 2013.

Burton et al. "FIVR—Fully integrated voltage regulators on 4th generation Intel® Core™ SoCs," 2014 IEEE Applied Power Electronics Conference and Exposition—APEC 2014, pp. 432-439, Mar. 2014.

Li et al. "High inductance Density Low-Profile Inductor Structure for Integrated Point-of-Load Converter" 2009 Twenty-Fourth Annual IEEE Applied Power Electronic Conference and Exposition, Feb. 2009, pp. 1011-1017.

Lee et al. "High Frequency Integrated Point-of-Load Converters: Overview", IEEE Transactions on Power Electronics, vol. 28, No. 9, Sep. 2013.

Le et al. "High-QThree-Dimensional Microfabricated Magnetic-Core Toroidal Inductors for Power Supplies in Package," IEEE Transactions on Power Electronics, vol. 34, pp. 74-85, Jan. 2019.

Hou et al. "Improving the efficiency and dynamics of 3D integrated POL," 2015 IEEE Applied Power Electronics Conference and Exposition (APEC), Charlotte, NC, 2015, pp. 140-145.

Su et al. "Low profile coupled inductor substrate with fast transient response", 2015 IEEE Applied Power Electronics Conference and Exposition (APEC), Charlotte, NC, 2015, pp. 1161-1168.

Hou et al. "Magnetic characterization technique and materials comparison for very high frequency IVR," 2016 IEEE Applied Power Electronics Conference and Exposition (APEC), pp. 657-662, Mar. 2016.

Sturcken et al. "Magnetic thin-film inductors for monolithic integration with CMOS," 2015 IEEE International Electron Devices Meeting (IEDM), pp. 11.4.1-11.4.4, Dec. 2015.

Dinulovic et al. "On-chip high performance magnetics for point-of-load high-frequency DC-DC converters," 2016 IEEE Applied Power Electronics Conference and Exposition (APEC), pp. 3097-3100, Mar. 2016.

Lambert et al. "Package Inductors for Intel Fully Integrated Voltage Regulators," IEEE Transactions on Components, Packaging and Manufacturing Technology, vol. 6, pp. 3-11, Jan. 2016.

Kulkarni et al. "PCB Embedded Bondwire Inductors With Discrete Thin-Film Magnetic Core for Power Supply in Package," IEEE Journal of Emerging and Selected Topics in Power Electronics, vol. 6, pp. 614-620, Jun. 2018.

Wong "Performance improvements of multi-channel interleaving voltage regulator modules with integrated coupling inductors," Ph. D. Dissertation, Virginia Tech, 2001.

Mathuna et al. "Review of Integrated Magnetics for Power Supply on Chip (PwrSoC)," IEEE Transactions on Power Electronics, vol. 27, pp. 4799-4816, Nov. 2012.

Hou "Very High Frequency Integrated POL for CPUs", Dissertation.

Hou et al. "Very High Frequency IVR for Small Portable Electronics With High-Current Multiphase 3-D Integrated Magnetics," IEEE Transactions on Power Electronics, vol. 32, pp. 8705-8717, Nov. 2017.

* cited by examiner

MULTI-PHASE INTEGRATED COUPLED INDUCTOR STRUCTURE

BACKGROUND

DC-DC step-down converters, especially buck converters, are widely used in many digital devices such as servers, telecoms, laptops, desktops, smartphones and so on. In most devices, multiphase buck converters are used to provide enough power to digital loads, and each buck converter requires one inductor. Compared with non-coupled inductors, negative coupled inductors can realize small current ripple and fast transient speed at the same time, which is preferred from a circuit performance point of view. On the other hand, negative coupling can reduce the DC flux in the magnetic core. Therefore, higher inductor current can be applied without magnetic core saturation. As the development of central processing units (CPUs) and graphics processing units (GPUs) in digital devices continuously grows, the power demand of digital devices is becoming higher and higher. As a result, more phases can be added to converters to meet high power demand. Meanwhile, small inductor size and low profile are becoming more and more critical for inductor design, due to limited space in digital devices.

Some negative coupled inductors can include pieces of magnetic core, and each magnetic piece can wrap two conductors. Each phase inductor is negatively coupled to another two inductors. While negative coupling can help to reduce DC flux in the magnetic core, existing structures can require one piece of magnetic core for each phase, which increases manufacturing complexity when the phase number becomes larger. Therefore, improving the design of multi-phase integrated inductors can help to improve the performance of multi-phase converters and other components.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

DETAILED DESCRIPTION

Figure 1:
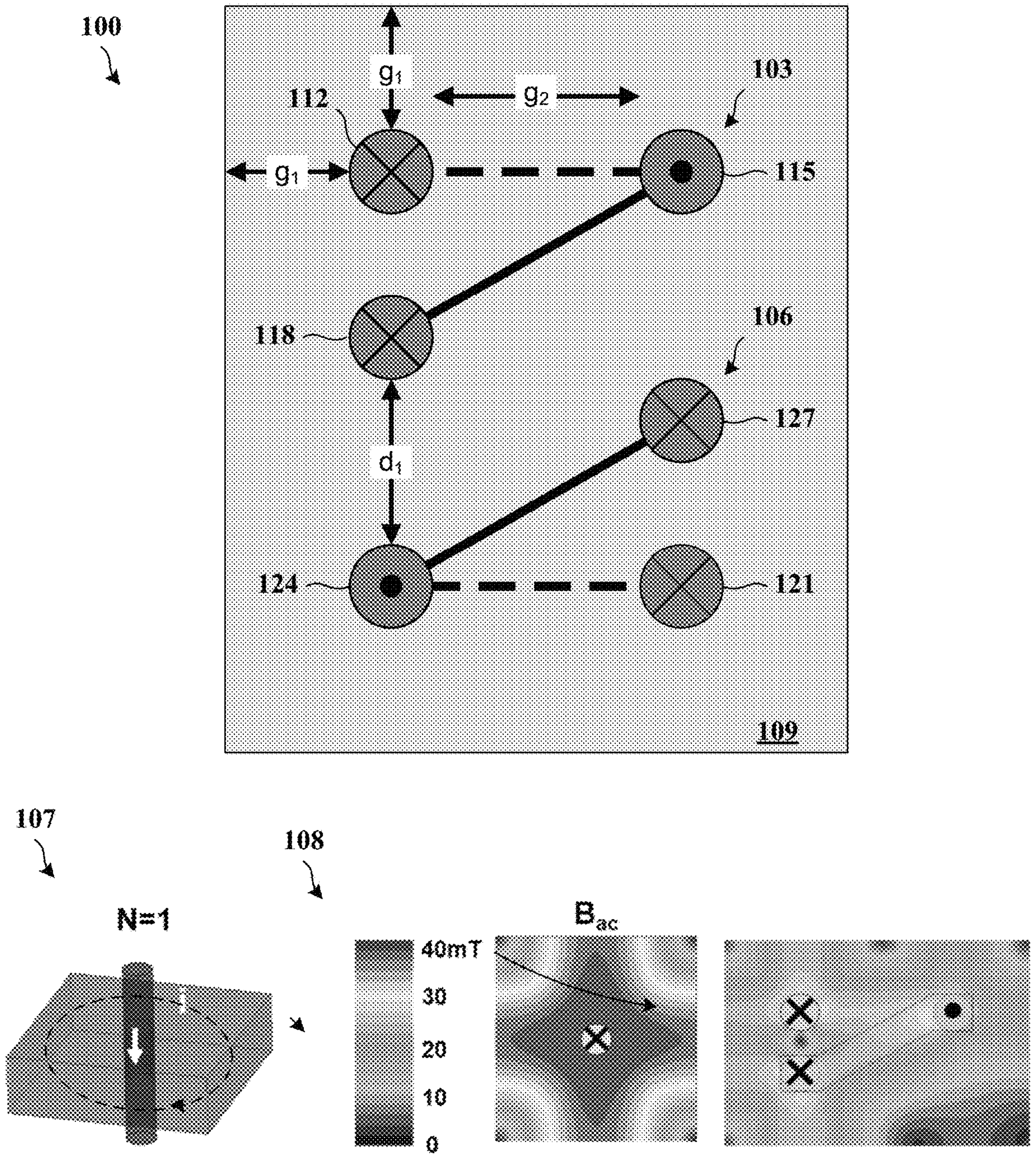
FIG. 1 illustrates an example of a multi-phase integrated coupled inductor, as well as a graph that compares single-via lateral flux structure to a three-via lateral flux structure, according to embodiments of the present disclosure.

The present disclosure relates to multi-phase integrated coupled inductor structures. Compared with a discrete inductor for each buck converter, for example, a multi-phase inductor integrated into one magnetic core can improve power density of multi-phase buck converters and simplify the fabrication and assembly process of the magnetic core and buck converters. The embodiments described herein are not limited to use with buck converters, however, as the concepts can be applied to improve the performance of other converter topologies.

Compared with a non-coupled inductor, a negative coupled inductor can realize small current ripple and fast transient speed at the same time, which is preferred from a circuit performance point of view. On the other hand, negative coupling can help reduce the DC flux or flux density in the magnetic core. Therefore, higher inductor current can be applied without magnetic core saturation. As the development of CPUs and GPUs in digital devices continuously grows, the power demand of digital devices is becoming higher and higher. As a result, more phases can be added to meet high power demand. Meanwhile, a small inductor size and a low profile are becoming more and more critical for inductor design, due to the limited space in digital devices.

Negative coupled inductors can include pieces of magnetic core, and each magnetic piece can wrap two conductors. Each phase inductor can be negatively coupled to another two inductors. While negative coupling can help to reduce DC flux in the magnetic core, existing structures can require one piece of magnetic core for each phase, which increases manufacturing complexity when the phase number becomes larger. In addition, some structures that include core slots can utilize a low permeability material in the slot.

While these structures can increase steady-state inductance while maintaining relatively low transient inductance, these structures can be complex and expensive to manufacture. Therefore, improving the design of multi-phase integrated inductors can help to improve the performance of multi-phase converters and other components. The present disclosure describes multi-phase integrated coupled inductor structures that provide a compact form factor using any odd number of vias larger than one in each inductor. These structures can provide a good ratio of steady-state inductance to transient inductance without using a low permeability material within the slots.

The structures described herein include multi-phase integrated coupled inductor structures. One aspect of the multi-phase integrated coupled inductor structures can include coupled inductors, where each inductor includes an asymmetrical arrangement of vias in two lines or columns of parallel vias. The lines or columns are parallel as they pass through a magnetic core in one example. In some examples, the lines can correspond to two symmetrical or same-length (including width and depth) open air core slots in the magnetic core. In other words, an inductor can have a different number of vias in each open air core slot.

A single slot can have a different number of vias from a first inductor than it has from a second inductor that is coupled to the first inductor. For two-phase coupled inductor structures, the positions or arrangement of the vias in the magnetic core can enable coupling between two inductors to be controlled by design without increasing the inductor footprint or adding an extra low permeability magnetic material.

Multi-phase integrated coupled inductor structures of any even number of phases are also proposed. By utilizing flux cancellation caused by phase shifting in multi-phase buck converters and adding extra slots to strengthen flux interaction between multi-phase inductors, smaller core loss and smaller inductor size can be achieved in the structures described herein. The structures can be applied to many portable electronic devices such as laptops, desktops, smartphones, as well as other consumer, industrial, and other electronic devices. The structures can be designed to fit within a footprint of a processor chip of the electronic device.

In one example, a multi-phase integrated coupled inductor system includes a coupled set of inductors integrated in a magnetic core. A first inductor of the coupled set of inductors includes a first plurality of conductive vias that extend through the magnetic core in two symmetrical core slots. The first plurality of conductive vias can be asymmetrically distributed in the two symmetrical core slots. A second inductor of the coupled set of inductors includes a second plurality of conductive vias that extend through the magnetic core in the two symmetrical core slots. The second plurality of conductive vias are asymmetrically distributed in the two symmetrical core slots. The coupled inductor system also includes a control circuit that controls at least one switch for the first inductor according to a first phase, and controls at least one switch for the second inductor according to a second phase. Other multi-phase integrated coupled inductors and inductor systems are described.

Turning to the drawings, FIG. 1 illustrates an example of a multi-phase integrated coupled inductor structure 100. The multi-phase integrated coupled inductor structure 100 is provided as one representative example to convey the concepts described herein. Other coupled inductor structures are described below with reference to other figures. The coupled inductor structure 100 can be used in a power converter, including a DC-DC step-down converter, such as a buck converter, although it is not limited to use in any particular topology of converter.

As shown, the multi-phase integrated coupled inductor structure 100 includes an inductor 103 and an inductor 106. The inductors 103 and 106 include vias, and the inductors 103 and 106 are each three-via structures. A single via lateral flux structure 107 is shown in FIG. 1 to provide a three-dimensional representation of the vias of the multi-phase integrated coupled inductor structure 100. The flux can be seen to be lateral to the core, since the via runs through the core, rather than along the core, as this can result in vertical inductance.

A graph 108 in FIG. 1 shows the flux density in a core around the single via lateral flux structure 107. In the example shown, the example can have a 2×2 mm footprint, 0.5 mm thickness and 0.15 mm radius for the via. High AC flux density can be seen in the core, which can cause significant core loss for the single via lateral flux structure 107 when used alone. A lateral flux structure or component can generate flux that is lateral, or parallel to the two opposite and largest surface area faces of the magnetic core, and parallel to a main board of a device that the lateral flux structure is a component of.

The three-via structure of each of the inductors 103 and 106 can reduce AC flux density in the core individually in comparison with the single via structure, as can be seen in the right side of the graph 108. In this example, the footprint and the thickness are kept the same for new structures. The combination of these structures can provide further benefit when formed and controlled as the multi-phase integrated coupled inductor structure 100.

The inductors 103 and 106 can be coupled inductor structures with a single magnetic core 109. For the vias, a black cross and a black dot represent current direction flowing into and out of the image, respectively. The inductor 103 includes vias 112, 115, and 118. As can be seen, the inductor 103 can include an asymmetrical arrangement of vias in two lines or columns from an overhead view.

The arrangement of vias 112, 115, and 118 of the inductor 103 can be referred to as asymmetric based on having a different number of vias in each of the two columns, such as two vias in the left column and one via in the right column. The inductor 106 includes vias 121, 124, and 127. As can be seen, the inductor 106 can also include an asymmetrical arrangement of vias in two lines or columns from an overhead view. The inductor 106 can also have a different number of vias in each of the two columns, such as one via in the left column and two vias in the right column.

Current flow through the inductor 103 can through a conductive path from a near side of the core 109 (i.e., the top of the sheet of FIG. 1), through the via 112 into the image towards an opposite far side of the core 109; over to the via 115 across a conductor on the far side of the core 109 as represented by the dashed line; up through the via 115 towards the near side of the core 109; over to the via 118 on a conductor on the near side of the core 109; and down through the via 118 into the image towards the far side of the core 109. Current can flow in either direction along the path as can be understood. The conductor can include any appropriate conductor, including a printed circuit board trace on a circuit board, an insulated conductor, a magnet wire, or another conductor.

In some cases, the distance to the edge of the core 109 from a via can be $g_1$, while $g_2$ is a lateral distance between vias. In some examples, the ratio of $g_1$:$g_2$ can be 2. However, the AC flux density is weaker in the middle area of the core 109, so the overall footprint of the multi-phase integrated coupled inductor structure 100 can be further reduced by reducing the distance $g_2$, for example, so that the ratio of $g_1$:$g_2$ is 1.5. In other cases, $g_2$ can be selected to reduce the distance to achieve a particular or predetermined maximum amount of inductor loss, such as no difference (i.e., 0%), 1%, 2%, 3%, 4%, 5%, or another threshold amount.

Current flow through the inductor 106 can flow through a conductive path from a near side of the core 109 through the via 121 into the image towards an opposite far side of the core 109; over to the via 124 across a conductor on the far side of the core 109 as represented by the dashed line; up through the via 124 towards the near side of the core 109; over to the via 127 across a conductor on the near side of the core 109; and down through the via 127 into the image towards the far side of the core 109.

The example multi-phase negatively coupled integrated inductor structure 100 shown in FIG. 1 includes two phases of coupled three-via inductors. However, any odd number of vias larger than one can be used for each inductor in other integrated inductor structures, and any even number of phases can be used in other integrated inductor structures. Therefore, the distance between two inductors, identified as $d_1$, can be small, and adding low permeability magnetic material is no longer needed to keep the coupling coefficient lower than one. This also simplifies the fabrication complexity of the magnetic core, and enables the inductor footprint to be smaller compared with existing structures.

Figure 2:
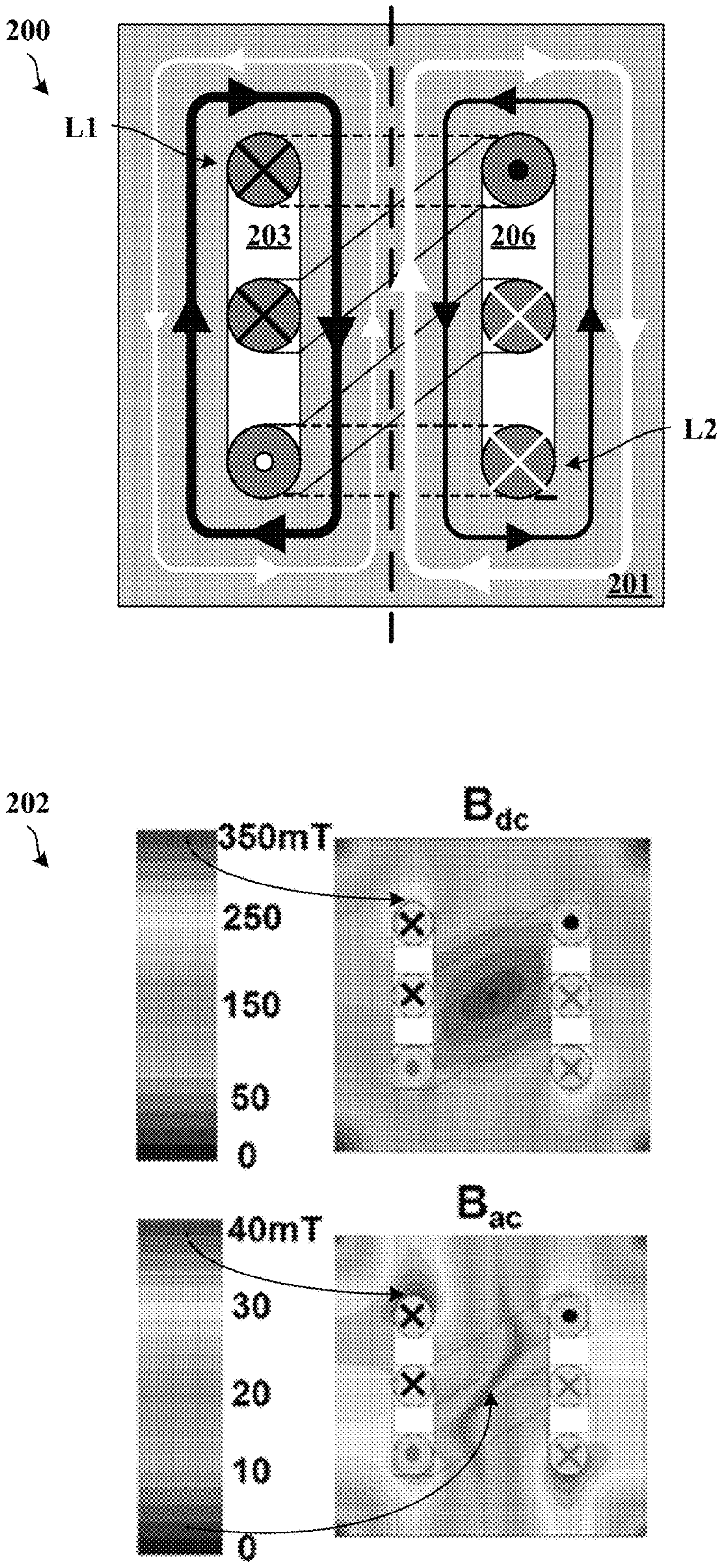
FIG. 2 illustrates another example of a multi-phase integrated coupled inductor with a slotted core, as well as a graph of AC and DC flux, according to embodiments of the present disclosure.

FIG. 2 shows an example of a multi-phase integrated coupled inductor structure 200, as well as a graph 202 of the DC and AC magnetic flux densities in the inductor structure 200. The multi-phase integrated coupled inductor structure 200 is provided as one representative example to convey the concepts described herein. The coupled inductor structure 200 can be used in a power converter, including a DC-DC step-down converter, such as a buck converter, although it is not limited to use in any particular topology of converter.

The multi-phase integrated coupled inductor structure 200 is similar in many respects to the multi-phase integrated coupled inductor structure 100, except that the multi-phase integrated coupled inductor structure 200 includes the core slots 203 and 206. The inductor L1 can include an asymmetrical arrangement of vias in two lines or columns from an overhead view. For the vias of L1, a black cross and a black dot represent current direction flowing into and out of the image, respectively. The black flux paths can be symbolic representations of general paths of the magnetic field and flux lines generated using the vias of L1 for discussion purposes, and are not intended to be exact or scale representations. The arrangement of vias of the inductor L1 can be referred to as asymmetric based on having a different number of vias in each of the two cores slots 203 and 206, such as two vias in the left core slot 203 and one via in the right core slot 206. The core slots 203 and 206 can be parallel and have a substantially similar or identical length, and can be referred to as symmetrical core slots.

For the vias of L2, a white cross and a white dot represent current direction flowing into and out of the image, respectively. The white flux paths can be symbolic representations of general paths of the magnetic field and flux lines generated using the vias of L2 for discussion purposes, and are not intended to be exact or scale representations. The inductor L2 can also include an asymmetrical arrangement of vias in two cores slots 203 and 206 from an overhead view, for example, having one via in the left two cores slot 203 and two vias in the right core slot 206.

Current flow through the inductor L1 can through a conductive path from the near side of the core 201 (i.e., the top of the sheet of FIG. 2), down through the top left via of L1 into the image towards an opposite far side of the core 201; over to the top right via of L1 across a conductor on the far side of the core 201; up through the top right via towards the near side of the core 201; over to the bottom left via of L1 through a conductor on the near side of the core 201, and down through that bottom left via into the image towards the far side of the core 201.

Current flow through the inductor L2 can flow through a conductive path from a near side of the core 201, through a bottom right via of L2 into the image towards an opposite far side of the core 201, over to the bottom left via across a conductor on the far side of the core 201, up through the bottom left via up towards the near side of the core 201, over to the top right via of L2 across a conductor on the near side of the core 201, and down through that top right via into the image towards the far side of the core 201.

As shown, the multi-phase integrated coupled inductor structure 200 includes the core slots 203 and 206. The multi-phase integrated coupled inductor structure 200 can otherwise be similar to the multi-phase integrated coupled inductor structure 100. The magnetic core 201 can guide magnetic fields and flux paths generated using the inductive structures that extend through the magnetic core 201. The magnetic core 201 can be formed from ferromagnetic materials or ferrimagnetic materials. The addition of a core slots 203 and 206, which can be open air gaps for the vias through the magnetic core 201 can further reduce AC flux density generated by the vias or other inductive structures that extend through the magnetic core 201. The magnetic core 201 can include a material with a high magnetic permeability relative to the surrounding air and the slots.

The core slots 203 and 206 are open air gaps in the magnetic core 201, and the air gaps or open core slots 203 and 206 can be added into the magnetic core 201 of this multi-phase integrated coupled inductor structure 200 to keep small transient inductance at light load. However, due to this special arrangement of via locations, the maximum coupling coefficient between two inductors is only −0.8. The multi-phase integrated coupled inductor structure 200 can include, for each inductor $L_1$ and $L_2$, an asymmetrical arrangement of vias in each of two columns, corresponding to the two symmetrical or same-length open core slots 203 and 206. The inductor $L_1$ can include two vias in the left core slot 203 and one via in the right core slot 206. The inductor $L_2$ can include one via in the left core slot 203 and two vias in the right core slot 206.

For example, one can consider the inductor $L_1$, and the flux distribution generated by the vias in the left core slot 203. There can be a clockwise direction flux of phase one corresponding to the inductor $L_1$ as indicated by the thick black line and arrows on the left side of the core 201. On the right side of the core 201, there can be an opposite counterclockwise flux generated by phase one corresponding to the inductor $L_1$ as indicated by the thin black line and arrows on the right side of the core 201. Since there is only one via on the right side, the flux is reduced compared to the flux in the left side. The second inductor $L_2$ generates flux corresponding to the thin white line and arrows on the left and thick white line and arrows on the right side of the core. This can be considered in the mutual induction portion of the analysis, as shown.

Inductance of the left core and the right core of the core 201 can be considered separately. Take phase 1 as an example, where only phase one corresponding to the inductor $L_1$ has excitation. For this analysis, first considering the inductance of right core, one can consider flux in the core, and ignore flux in the air slot. Self inductance of $L_1$ in the right hand side of the core, $L_{self1\_right}$, can be described using equation (1).

$$L_{self1\_right} = N\frac{d\Phi}{di} = \frac{d\Phi_1}{di_1} \triangleq L \tag{1}$$

N can be 1 since there is one via on the right hand side. Mutual inductance in consideration of the right side of L2, $M_{12\_right}$, can be described using equation (2), in view of the mutual effect of two vias for $L_2$ on the right side of the core.

$$M_{12\_right} = -2\frac{d\Phi_1}{di_1} = -2L \tag{2}$$

On the other side, self inductance of $L_1$ in the left hand side of the core, $L_{self1\_left}$, can be described using equation (3), since there are two vias for $L_1$ on the left side.

$$L_{self1\_left} = 2\frac{d(2\Phi_1)}{di_1} = 4L \quad (3)$$

Mutual inductance in consideration of the left side of $L_1$, $M_{12\_left}$, can be described using equation (4), since there is one via for $L_2$ on the left side of the core.

$$M_{12\_left} = -\frac{d(2\Phi_1)}{di_1} = -2L \quad (4)$$

$L_{self1\_total}$ can be can be described using equation (5).

$$L_{self1\_total}=4L+L=5L \quad (5)$$

$M_{12\_total}$ can be described using equation (6).

$$M_{12\_total}=-(2L+2L)=-4L \quad (6)$$

The coupling coefficient α can be described using equation (7).

$$\alpha \triangleq \frac{M_{12\_total}}{L_{self1\_total}} = -0.8 \quad (7)$$

Figure 3:
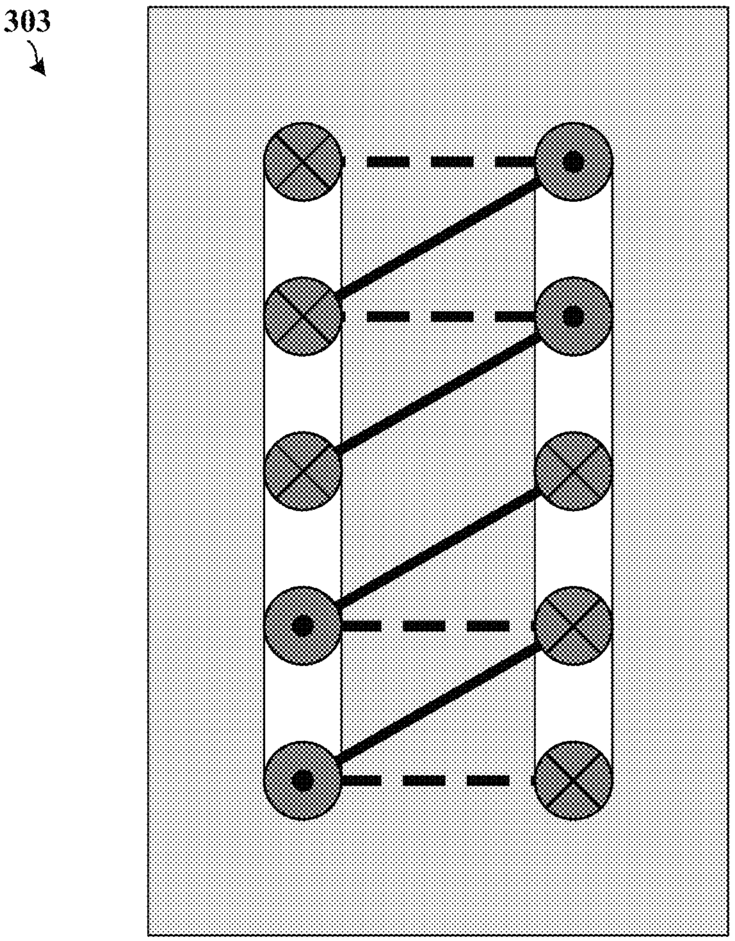
FIG. 3 illustrates another example of a multi-phase integrated coupled inductor with a slotted core, according to embodiments of the present disclosure.

FIG. 3 shows an example multi-phase integrated coupled inductor structure 303. This shows one way that a multi-phase integrated coupled inductor structure can be expanded or extended to include additional vias, and any odd number of vias through open air slots within a core. For the vias in each inductor in FIG. 3, a black cross represents current direction flowing into the image, and a black dot represents current direction flowing out of the image. Solid lines can represent conductors on a near side of the magnetic core, while dashed lines can represent conductors across a far side of the magnetic core.

The multi-phase integrated coupled inductor structure 303 can be considered a "3+2" or "3:2" structure, referring to respective vias in corresponding air gaps, since each of the two coupled inductors has 3 vias in a first open air core slot and 2 vias in a second open air core slot. As can be understood, any "(N)+(N−1)" structure can be constructed, where N is an odd integer, and N−1 corresponds to an integer greater than zero, an integer greater than or equal to one, or a non-zero positive integer. These structures can be an asymmetrical arrangement of vias in two columns, which in some examples can correspond to two symmetrical or same-length open air core slots.

Figure 4:
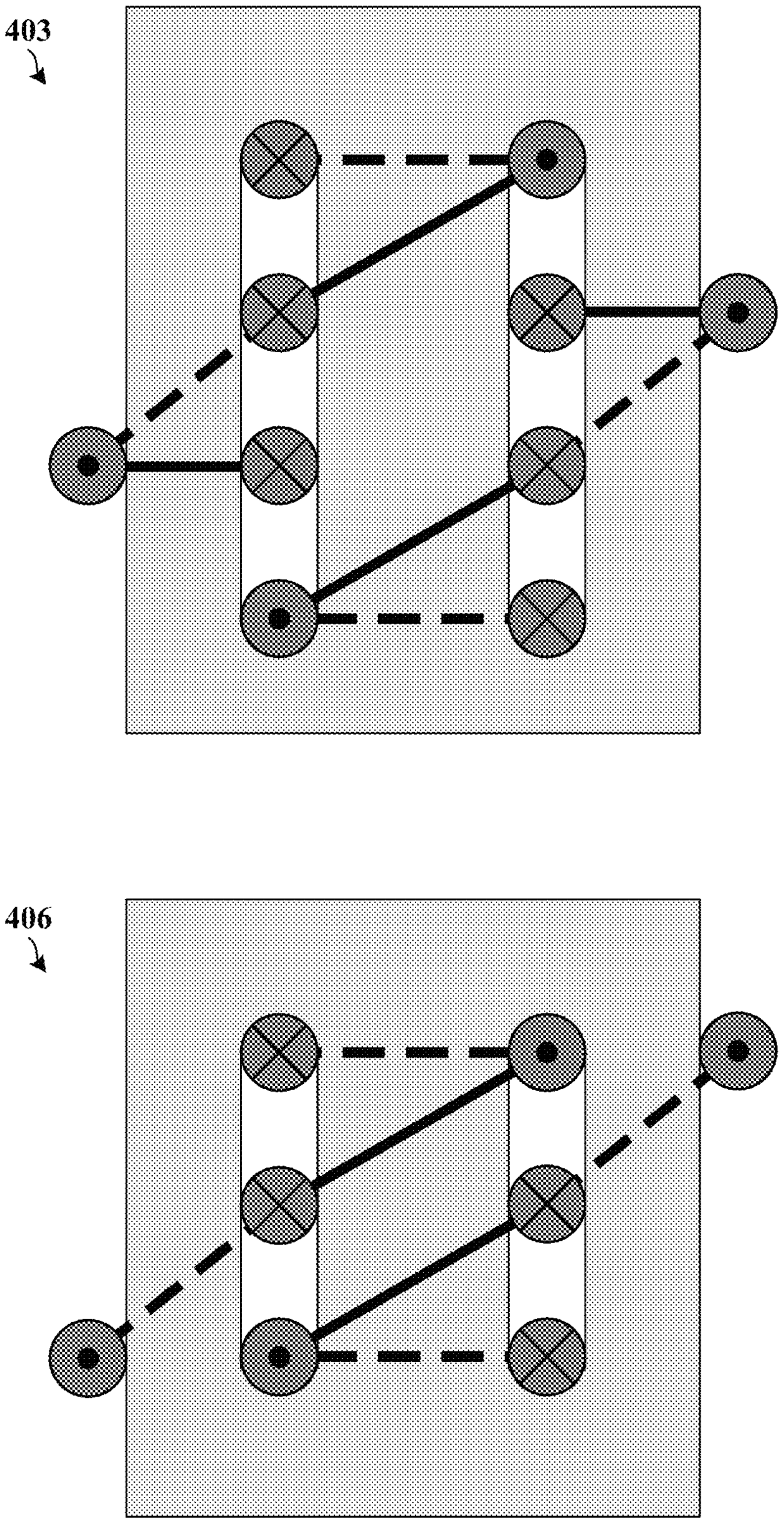
FIG. 4 illustrates examples of multi-phase integrated coupled inductors with slotted cores and vias outside the core, according to embodiments of the present disclosure.

FIG. 4 shows an example multi-phase integrated coupled inductor structure 403 and an example multi-phase integrated coupled inductor structure 406. The multi-phase integrated coupled inductor structure 403 shows that some examples can enable a multi-phase integrated coupled inductor structure to include a wide variety of ratios between vias in corresponding air gaps by including vias that are outside of, or unsurrounded by, the core.

A black cross represents current direction flowing into the image, and a black dot represents current direction flowing out of the image. Solid lines can represent conductors on a near side of the magnetic core, while dashed lines can represent conductors across a far side of the magnetic core. The multi-phase integrated coupled inductor structure 403 can be considered a "3+1" or "3:1" structure.

The multi-phase integrated coupled inductor structure 406 shows that some examples can enable a multi-phase integrated coupled inductor structure to have connections to a single side of the core by including vias that are outside of the core. For example, the multi-phase integrated coupled inductor structure 406 can be considered a "2+1" or "2:1" structure, which is substantially similar to the multi-phase integrated coupled inductor structure 200 of FIG. 2. However, in this example, the vias that are outside of the core can enable each inductor of the structure to include a current path that starts and ends on a single side of the core and within a footprint of the processor component, where connections corresponding to the start and the end of the current path are on a single side of the core.

Figure 5:
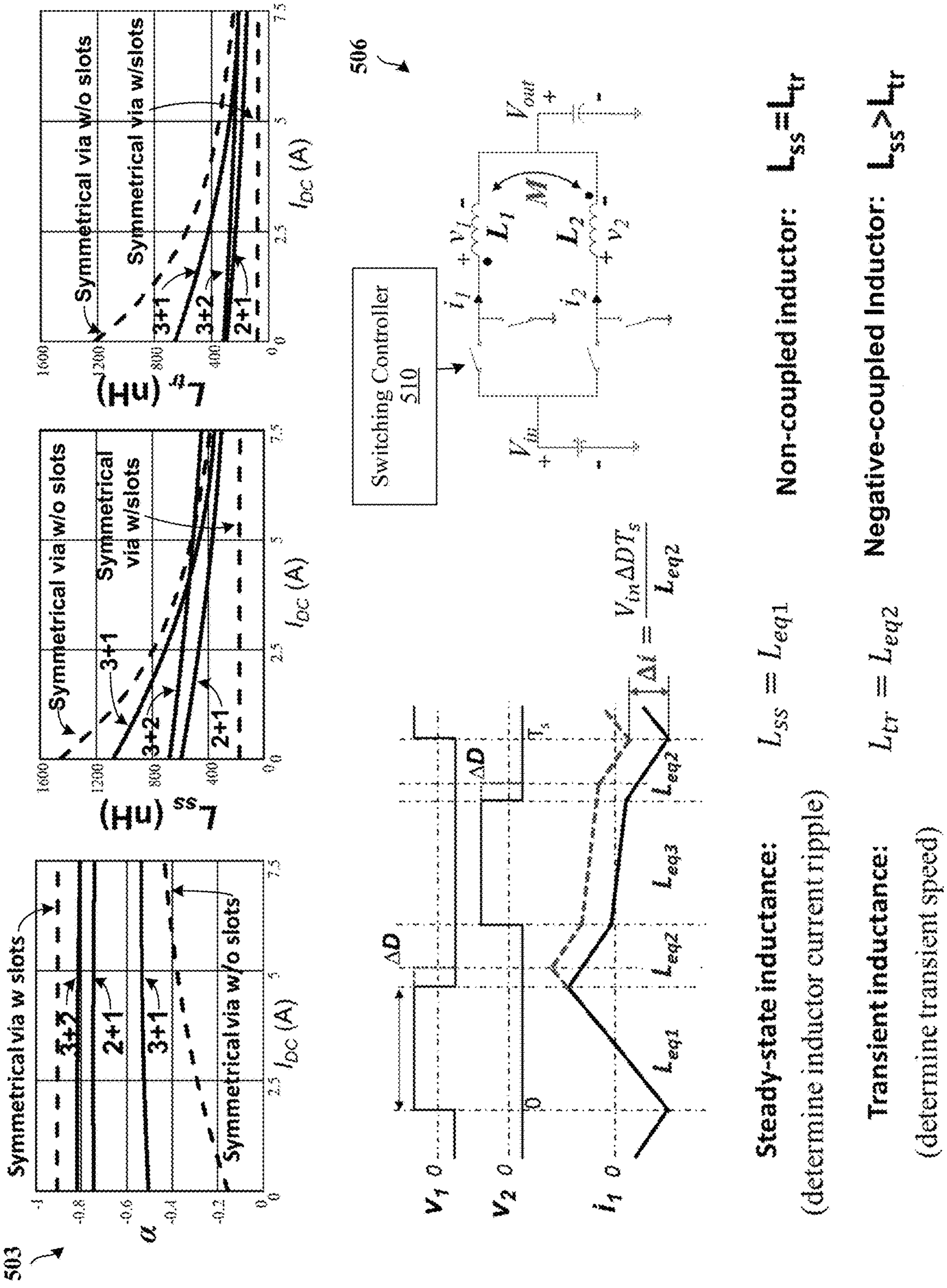
FIG. 5 illustrates graphs of parameters of various inductor structures along with a diagram of a coupled inductor structure, according to embodiments of the present disclosure.

FIG. 5 shows a set of graphs 503 for coupling coefficient, steady-state inductance, and transient inductance for various structures. Generally, steady state inductance can be described using equation (8).

$$L_{ss} = L_{self}\frac{1-\alpha^2}{1+\alpha\frac{D}{1-D}} \quad (8)$$

Transient inductance can be described using equation (9).

$$L_{tr}=L_{self}(1+\alpha) \quad (9)$$

This set of graphs 503 shows that the "2+1," "3+2," and "3+1" structures can provide good performance including a higher steady state inductance than transient inductance for each example, without using a low permeability material within slots.

FIG. 5 also shows an example diagram 506 and corresponding graph that shows how coupled inductors can be controlled to have a particular switching sequence using a switching controller 510 to achieve a higher steady state inductance than transient inductance. For non-coupled inductors, steady state inductance $L_{ss}$ can be equal to transient inductance $L_{tr}$. However, when negative coupled inductors are used, steady state inductance $L_{ss}$ can be greater than transient inductance $L_{tr}$. In the graph, steady state inductance $L_{ss}$ can correspond to $L_{eq1}$, which can be related to inductor current ripple. Transient inductance $L_{tr}$ can correspond to $L_{eq2}$, which can be related to transient speed.

Figure 6:
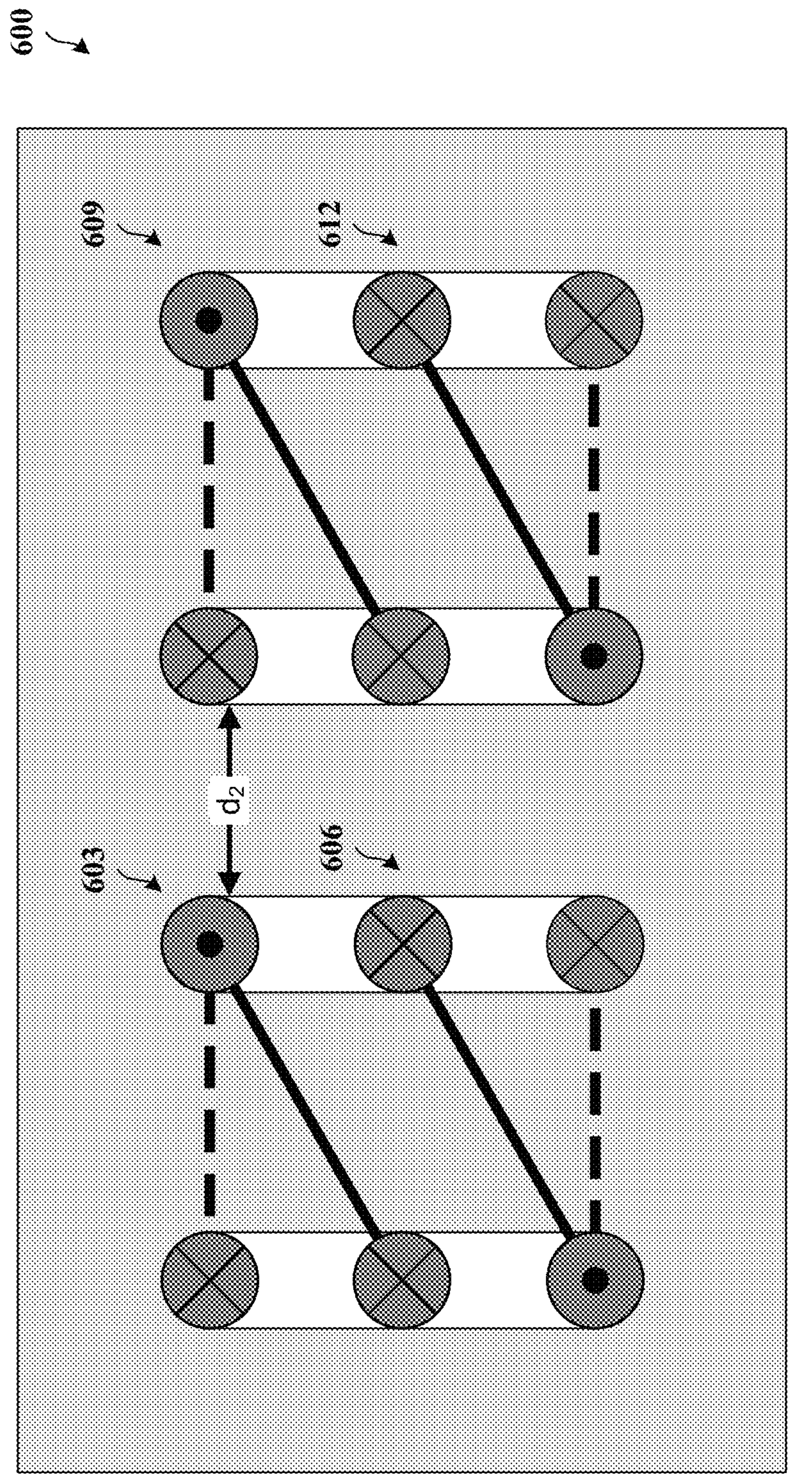
FIG. 6 illustrates another example of a multi-phase integrated coupled inductor with a slotted core, according to embodiments of the present disclosure.
Figure 7:
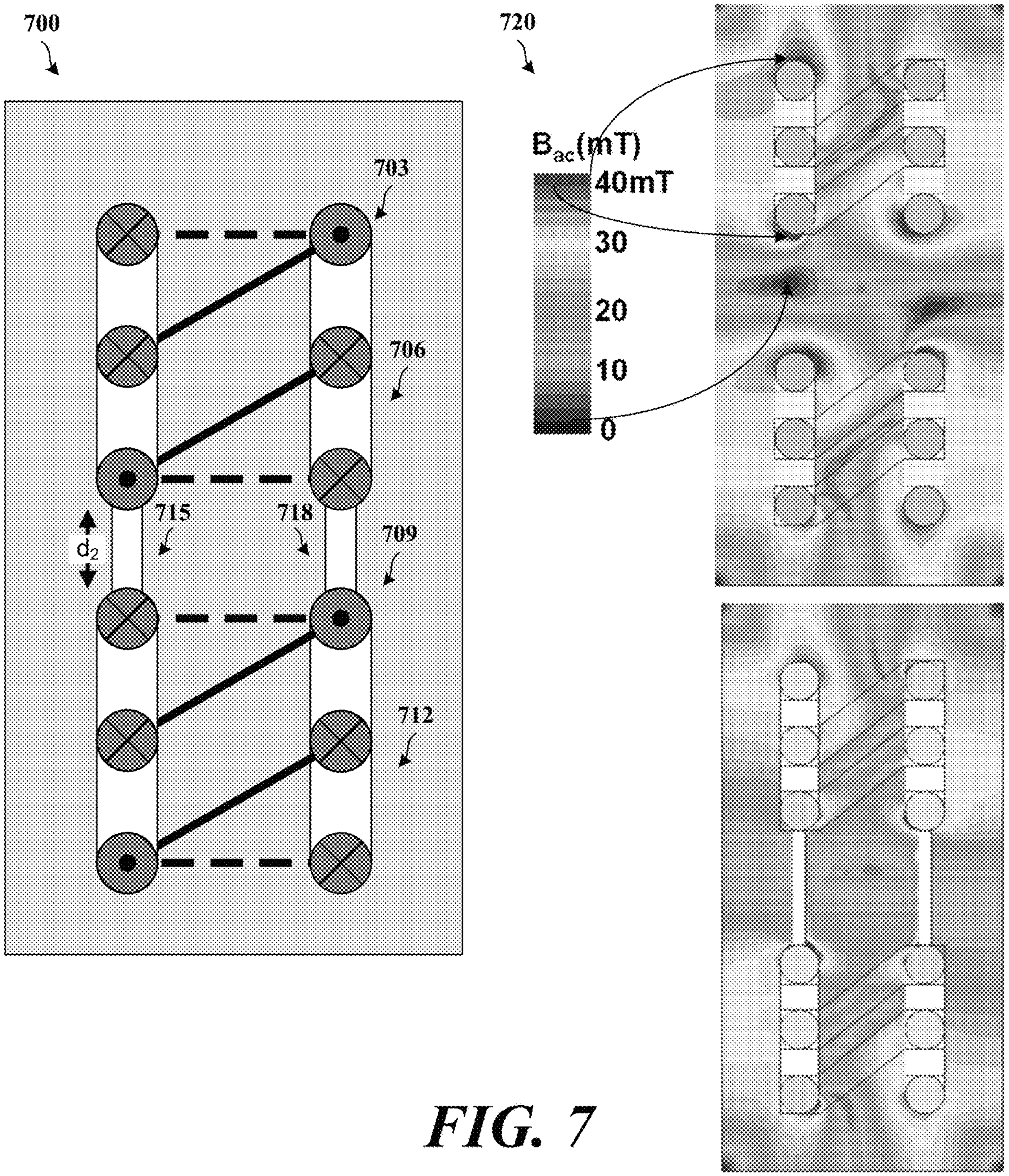
FIG. 7 illustrates another example of a multi-phase integrated coupled inductor with a slotted core, according to embodiments of the present disclosure.

The switching controller 510 or control circuit can be embodied as a power management integrated circuit, for example. The switching controller 510 can control one or more switches for the inductor $L_1$ according to a first phase, and control one or more switches for the inductor $L_2$ according to a second phase. If there are more inductors, as shown in FIGS. 6 and 7, additional phases can be controlled. In some cases, adjacent inductors can be controlled by switching to correspond to different phases. $V_1$ and $V_2$ can substantially be controlled by the switches of a branch of a corresponding inductor shown in the diagram 506.

The switching controller 510 can be embodied in the form of hardware, firmware, software executable by hardware, or as any combination thereof. If embodied as hardware, the switching controller 510 be implemented as a collection of discrete analog, digital, or mixed analog and digital circuit components. The hardware can include one or more discrete logic circuits, microprocessors, microcontrollers, or digital signal processors (DSPs), application specific integrated circuits (ASICs), programmable logic devices (e.g., field-programmable gate array (FPGAs)), or complex programmable logic devices (CPLDs)), among other types of processing circuitry.

FIG. 6 shows an example four-phase integrated coupled inductor structure 600 with three vias for each inductor. For the vias in each inductor in FIG. 6, a black cross represents current direction flowing into the image, and a black dot represents current direction flowing out of the image. Solid lines can represent conductors on a near side of the magnetic core, while dashed lines can represent conductors across a far side of the magnetic core.

This structure can include strong negative coupling between inductor 603 and inductor 606, as well as between inductor 609 and inductor 612. The coupling between any other two inductors can be controlled by controlling the distance $d_2$ between the structures. In general, the couplings between other sets of inductors can be weaker than the coupling between inductor 603 and inductor 606, and the coupling between inductor 609 and inductor 612. In the core area controlled by distance $d_2$, the flux of all four phases can interact with each other due to magnetic integration. By controlling phase shifting between four phases, the AC flux density can become smaller in this area. Therefore, the core loss of the four-phase inductor structures can be smaller than that of two, two-phase inductor structures. Then inductor size of these four-phase inductor structures can be further reduced by reducing distance $d_2$. While the four-phase integrated coupled inductor structure 600 appears like two of the multi-phase integrated coupled inductor structures 200 of FIG. 2, multiple ones of any of the structures described can be adapted for multi-phase structures for any even number of phases.

FIG. 7 shows an example four-phase integrated coupled inductor structure 700 with three vias for each inductor. For the vias in each inductor in FIG. 6, a black cross represents current direction flowing into the image, and a black dot represents current direction flowing out of the image. Solid lines can represent conductors on a near side of the magnetic core, while dashed lines can represent conductors across a far side of the magnetic core.

This structure can include a strong negative coupling between inductor 703 and inductor 706, as well as between inductor 709 and inductor 712. The coupling between any other two inductors can be controlled by controlling the distance $d_2$ between the structures. In general, the couplings between other sets of inductors can be weaker than the coupling between inductor 703 and inductor 706, and the coupling between inductor 709 and inductor 712. In the core area controlled by distance $d_2$, the flux of all four phases can interact with each other due to magnetic integration. And because of phase shifting between four phases, the AC flux density can become smaller in this area. Therefore, the core loss of the four-phase inductor structures can be smaller than that of two, two-phase inductor structures. Then the inductor size of these four-phase inductor structures can be further reduced by reducing distance $d_2$. While the four-phase integrated coupled inductor structure 700 appears like two of the multi-phase integrated coupled inductor structures 200 of FIG. 2, multiple ones of any of the structures described can be adapted for multi-phase structures for any even number of phases.

Furthermore, the four-phase integrated coupled inductor structure 700 can include slots 715 and 718 added between inductor 706 and inductor 709. In some cases, these slots 715 and 718 can be between two sets of coupled inductors, here a first coupled set corresponds to inductors 703 and 706, and a second coupled set corresponds to inductors 709 and 712. All inductors can be considered a set of four coupled inductors of the overall structure, and one or more switching control circuit can control the phases corresponding to each inductor in order to provide the desired characteristics, such as higher steady state inductance compared to transient inductance. The coupling slots 715 and 718 can be thinner than the slots containing the vias, or in other cases one long slot can contain all vias of all four coupled inductors, including two sets of two coupled inductors.

These coupling slots 715 and 718 can increase the coupling between inductor 703 and inductor 709, between inductor 706 and inductor 709, and between inductor 706 and inductor 712. They create positive coupling between inductor 703 and inductor 709, and between inductor 706 and inductor 712, as well as negative coupling between inductor 706 and inductor 709. In other words, the coupling between adjacent inductors is negative while the coupling between alternate or every-other inductor is positive. The slots can have little impact on coupling between inductor 703 and inductor 706, between inductor 709 and inductor 712, and between inductor 703 and inductor 712. The couplings created by these extra coupling slots are impacted by the width of these slots, which can be named $l_g$. Due to stronger interaction between all fluxes of four phases and phase shifting, the AC flux density in this structure is reduced compared with that of four-phase structure without extra slots, as shown in the graph 720. Therefore, this structure can have smaller core loss.

Figure 8:
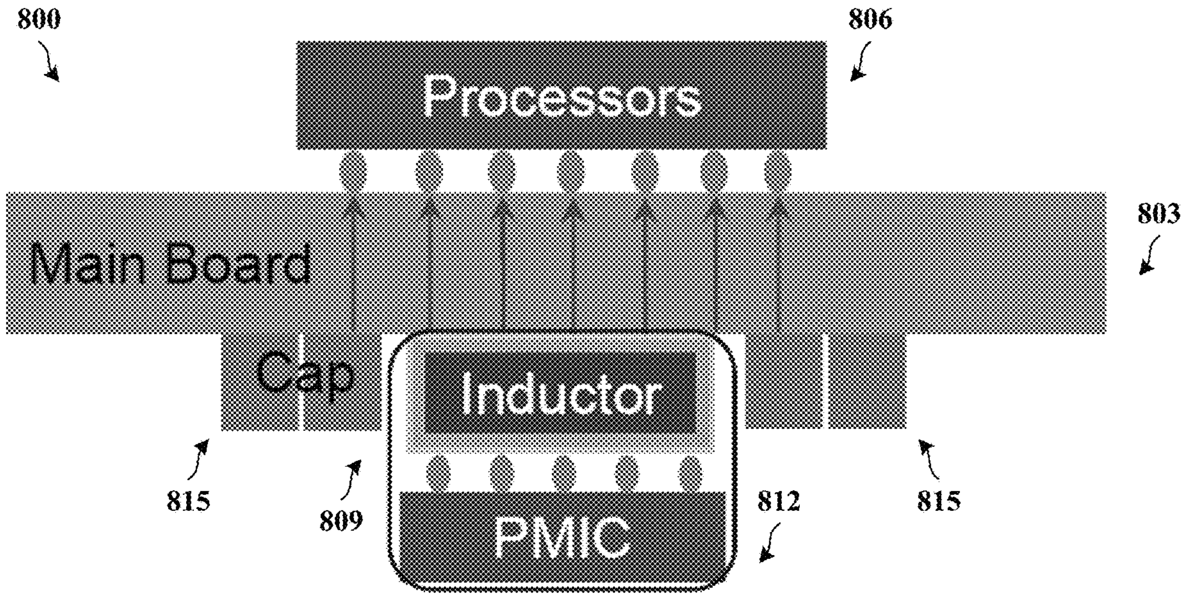
FIG. 8 illustrates an example of an integrated circuit that includes a multi-phase integrated coupled inductor, according to embodiments of the present disclosure.

FIG. 8 shows a device 800 that uses a multi-phase integrated coupled inductor structure. The device 800 can correspond to portable electronic devices such as laptops, desktops, smartphones, as well as other consumer, industrial, and other electronic devices. The device 800 can include a main board 803, a processor chip 806, a lateral inductor component 809, a power management integrated circuit 812, as well as a number of capacitors and other circuit components 815. This figure shows that the space savings of the lateral inductor component 809, having any of the multi-phase integrated coupled inductor structures described, can be designed to fit in a footprint of a processor chip 806. The structures described can meet the expanding inductance needs of electronic devices while also saving space and providing a thinner structure.

The processor chip or component 806 can be connected on a first side of the main board 803, while the lateral inductor component 809, power management integrated circuit 812, capacitors and other circuit components 815 are located on an opposite side of the main board 803. Unlike existing technologies, the lateral-flux structures described enable the lateral inductor component 809 to fit within a footprint of a processor chip 806, and between the processor chip 806 (and main board 803) and the power management integrated circuit 812. In some cases, the main board 803 can be etched away or otherwise indented or cut away, such that the lateral inductor component 809 is fully or partially embedded into the main board 803 or other substrate.

The switching controller 510 can execute software to perform the control aspects of the embodiments described herein. Any software or program instructions can be embodied in or on any suitable type of non-transitory computer-readable medium for execution. Example computer-readable mediums include any suitable physical (i.e., non-transitory or non-signal) volatile and non-volatile, random and sequential access, read/write and read-only, media, such as hard disk, floppy disk, optical disk, magnetic, semiconductor (e.g., flash, magneto-resistive, etc.), and other memory devices. Further, any component described herein can be implemented and structured in a variety of ways. For example, one or more components can be implemented as a combination of discrete and integrated analog and digital components.

Also, any functionalities described herein that include software or code instructions can be embodied in any non-transitory computer-readable medium, which can include any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including, for example, static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or functionality described herein can be implemented and structured in a variety of ways. For example, one or more applications described can be implemented as modules or components of a single application or set of instructions. Further, one or more instructions described herein can be executed in shared or separate computing devices or a combination thereof.

The above-described examples of the present disclosure are merely possible examples of implementations set forth for a clear understanding of the principles of the disclosure. While aspects and figures are provided for clarity of discussion, it is understood that the concepts described with respect to a particular figure or context can be utilized and combined with the concepts described with respect to the other figures and contexts. These variations and modifications can be made without departing substantially from the principles of the disclosure. All such modifications and variations are intended to be included herein within the scope of this disclosure and protected by the following claims.

Therefore, the following is claimed:

1. A multi-phase integrated coupled inductor system comprising:

a coupled set of inductors integrated in a magnetic core comprising two symmetrical core slots separated by a central portion of the magnetic core;

a first inductor of the coupled set of inductors comprising a first plurality of conductive vias having a uniform size and shape that extend through the magnetic core in the two symmetrical core slots, wherein the first plurality of conductive vias are asymmetrically distributed in the two symmetrical core slots proximal to a first longitudinal end of the magnetic core with pairs of adjacent vias in the two symmetrical core slots aligned on opposite sides of the central portion of the magnetic core and the uniform size corresponds to a width of the two symmetrical core slots;

a second inductor of the coupled set of inductors comprising a second plurality of conductive vias having the uniform size and shape that extend through the magnetic core in the two symmetrical core slots, wherein the second plurality of conductive vias are asymmetrically distributed in the two symmetrical core slots proximal to a second longitudinal end of the magnetic core relative to the first plurality of conductive vias with pairs of adjacent vias in the two symmetrical core slots aligned on opposite sides of the central portion of the magnetic core, wherein the first inductor is located at the first longitudinal end of the magnetic core and is separated a longitudinal distance from the second inductor located at the second longitudinal end of the magnetic core relative to the first inductor; and at least one control circuit that controls a first at least one switch for the first inductor according to a first phase, and controls a second at least one switch for the second inductor according to a second phase.

2. The multi-phase integrated coupled inductor system of claim 1, wherein a respective via of the first plurality of conductive vias and the second plurality of conductive vias generates lateral flux in the magnetic core.

3. The multi-phase integrated coupled inductor system of claim 1, wherein the first plurality of conductive vias are asymmetrically distributed by including a first at least one via in a first core slot and a second at least one via in a second core slot, wherein a first count of the first at least one via is different from a second count of the second at least one via.

4. The multi-phase integrated coupled inductor system of claim 1, wherein the first inductor further comprises a first at least one external via outside of the magnetic core.

5. The multi-phase integrated coupled inductor system of claim 1, wherein the magnetic core and a lateral inductor component fits within a footprint of a processor, and a first side of the lateral inductor component is connected to a processor component, and an opposite side of the lateral inductor component is connected to a power management integrated circuit comprising the at least one control circuit.

6. The multi-phase integrated coupled inductor system of claim 1, further comprising:

a second coupled set of inductors with asymmetrically arranged vias within a second set of two symmetrical core slots; and a set of two coupling slots between the coupled set of inductors and the second coupled set of inductors, wherein a plurality of coupled inductors of the multi-phase integrated coupled inductor system comprise the coupled set of inductors and the second coupled set of inductors.

7. The multi-phase integrated coupled inductor system of claim 6, wherein the set of two coupling slots is aligned with the two symmetrical core slots and the second set of two symmetrical core slots.

8. An electronic device comprising:

a power management integrated circuit;

a processor component; and a multi-phase integrated coupled inductor structure physically located between the power management integrated circuit and the processor component, the multi-phase integrated coupled inductor structure comprising:

a coupled set of inductors comprising first and second inductors, wherein the first inductor comprises a first plurality of conductive vias asymmetrically distributed in two symmetrical core slots in a magnetic core with pairs of adjacent vias in the two symmetrical core slots aligned on opposite sides of a central portion of the magnetic core separating the two symmetrical core slots, the first plurality of conductive vias having a uniform cross-sectional shape and size corresponding to a width of the two symmetrical core slots, wherein the first inductor is located at a first longitudinal end of the two symmetrical core slots and is separated a longitudinal distance from the second inductor located at a second longitudinal end of the two symmetrical core slots relative to the first inductor, and the second inductor comprises a second plurality of conductive vias asymmetrically distributed in the two symmetrical core slots with pairs of adjacent vias in the two symmetrical core slots aligned on opposite sides of the central portion of the magnetic core, the second plurality of conductive vias having the uniform cross-sectional shape and size corresponding to the width of the two symmetrical core slots.

9. The electronic device of claim 8, wherein the power management integrated circuit controls the first inductor and the second inductor of the coupled set of inductors according to a corresponding phase of a plurality of phases of the multi-phase integrated coupled inductor structure.

10. The electronic device of claim 8, wherein each of the first and second plurality of conductive vias are asymmetrically distributed in the two symmetrical core slots so that a different number of vias are used in one of the two symmetrical core slots compared with another one of the two symmetrical core slots.

11. The electronic device of claim 8, wherein the multi-phase integrated coupled inductor structure comprises a lateral flux structure that generates lateral flux in the magnetic core.

12. The electronic device of claim 11, wherein the lateral flux comprises a flux path that is substantially parallel to a largest surface area face of the magnetic core and perpendicular to a respective one of the first or second plurality of conductive vias.

13. The electronic device of claim 8, wherein the first inductor and the second inductor further comprise at least one external via outside of the magnetic core.

14. The electronic device of claim 8, wherein a current path of the first inductor and the second inductor starts and ends on a single side of the magnetic core within a footprint of the processor component.

15. A multi-phase integrated coupled inductor structure comprising:

a magnetic core comprising two symmetrical core slots separated by a central portion of the magnetic core; and a coupled set of inductors comprising first and second inductors, wherein the first inductor comprises a first plurality of conductive vias having a uniform cross-sectional shape and size corresponding to a width of the two symmetrical core slots, the first plurality of conductive vias asymmetrically distributed among the two symmetrical core slots in the magnetic core with pairs of adjacent vias in the two symmetrical core slots aligned on opposite sides of the central portion of the magnetic core, and the second inductor comprises a second plurality of conductive vias having the uniform shape and size corresponding to the width of the two symmetrical core slots, the second plurality of conductive vias asymmetrically distributed among the two symmetrical core slots in the magnetic core with pairs of adjacent vias in the two symmetrical core slots aligned on opposite sides of the central portion of the magnetic core, wherein the first inductor is separated a longitudinal distance from the second inductor in the magnetic core.

16. The multi-phase integrated coupled inductor structure of claim 15, wherein a respective via of the first or second plurality of conductive vias generates lateral flux in the magnetic core.

17. The multi-phase integrated coupled inductor structure of claim 15, wherein the first plurality of conductive vias are asymmetrically distributed by including a first at least one via in a first core slot and a second at least one via in a second core slot, wherein a first count of the first at least one via is different from a second count of the second at least one via.

18. The multi-phase integrated coupled inductor structure of claim 15, wherein the first inductor further comprises at least one external via outside of the magnetic core.

19. The multi-phase integrated coupled inductor structure of claim 15, wherein the coupled set of inductors comprises an even number of inductors corresponding to an even number of phases of the multi-phase integrated coupled inductor structure.

20. The multi-phase integrated coupled inductor structure of claim 15, further comprising a set of two coupling slots between a first coupled pair of the coupled set of inductors and a second coupled pair of the coupled set of inductors.

* * * * *